Dec. 21, 1965  V. B. HAAS, JR  3,225,282
THREE PHASE INVERTER SYSTEM WITH VOLTAGE AND PHASE CONTROL
Filed Dec. 24, 1962  3 Sheets-Sheet 2

INVENTOR
VINTON B. HAAS JR.
BY Roy A. Van Kirk
ATTORNEY

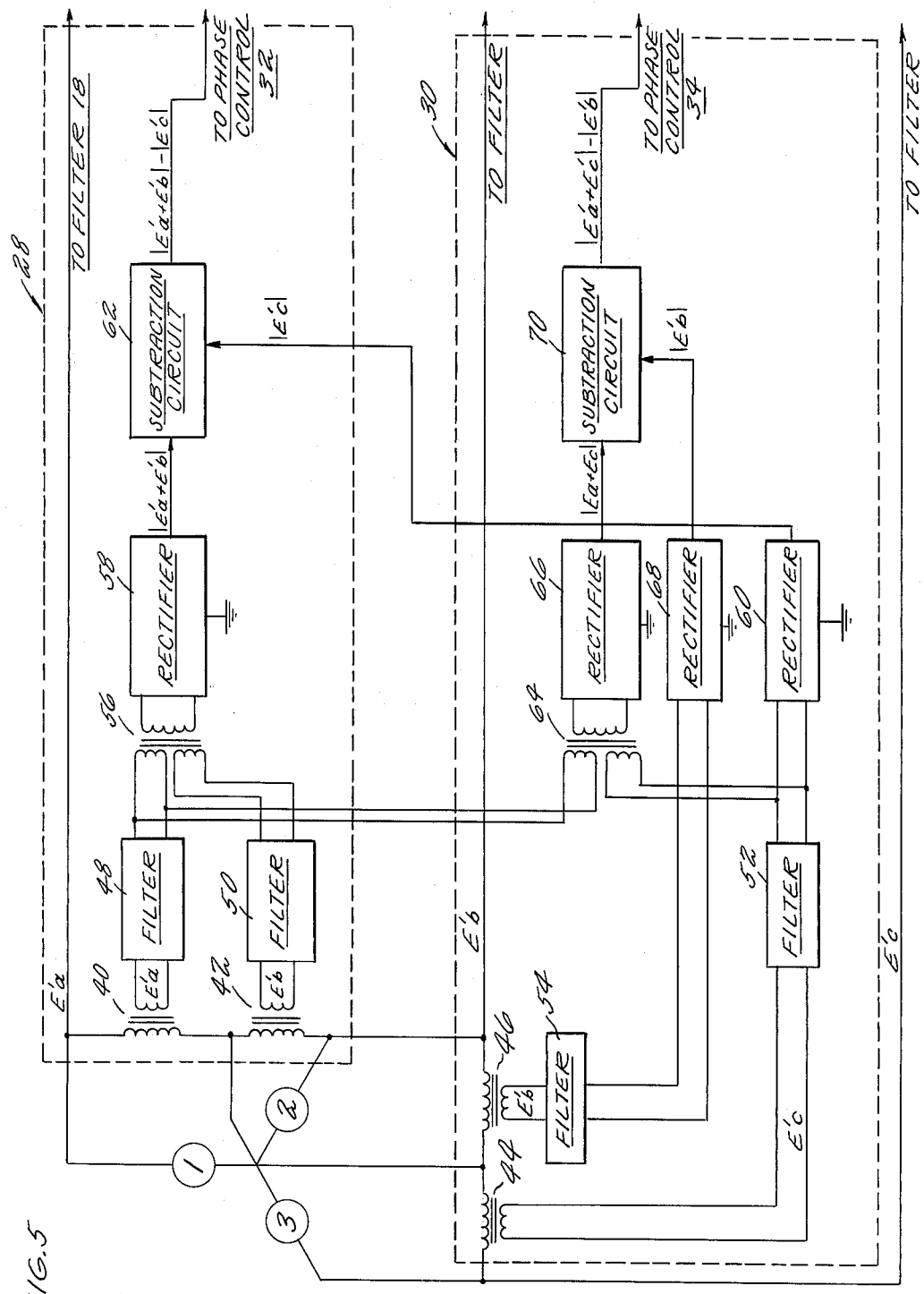

United States Patent Office 3,225,282
Patented Dec. 21, 1965

3,225,282
THREE PHASE INVERTER SYSTEM WITH VOLTAGE AND PHASE CONTROL
Vinton V. Haas, Jr., Storrs, Conn., assignor to United Aircraft Corporation, East Hartford, Conn., a corporation of Delaware
Filed Dec. 24, 1962, Ser. No. 246,746
6 Claims. (Cl. 321—3)

My invention relates to apparatus for converting a direct current to a three-phase alternating current. More particularly, my invention relates to a novel three-channel static inverter the output of which may be tied in delta or be applied to a three-leg transformer.

As is well known, a static inverter is a device which produces alternating current from direct current without an operational dependence on relative mechanical motion between component parts. In their usual environment, such as the power supply for an aircraft or manned satellite, the size and weight of the inverter is a prime consideration. However, while it is desired to minimize size and weight, it is a further objective of inverter design to provide a three-phase source with its characteristic of constant power being delivered to a balanced load. In the prior art, three-phase output from the inverter has been achieved by operating two inverter channels with a controlled phase relationship therebetween into a two-phase to three-phase conversion device such as a pair of transformers connected in Scott-T configuration. Another previously tried approach to obtaining three-phase output has been the use of three inverter channels with a controlled phase relationship therebetween feeding three independent output transformers. For reasons to be detailed below, it has not previously been possible to operate three inverter channels into a three-leg transformer or to tie the outputs of three channels in delta. The advantages of a three-leg transformer as compared with three single-phase transformers or a Scott-T connection are that it weighs less, suppresses third harmonics thus permitting a saving in the weight and size of the filters which must be used in each inverter channel, three-phase service is available even if one channel fails, and the outputs from the three-leg transformer may be connected in either Y or delta. Thus, in the prior art, the objectives of minimum size and weight, as obtainable by use of a three-leg output transformer, has been inconsistent with three-phase service.

My invention overcomes the above discussed disadvantages of the prior art by providing a three-channel static inverter utilizing a novel control technique which permits operating said three channels into a three-leg transformer or tying them in delta.

It is therefore an object of my invention to convert a direct current into a three-phase alternating current.

It is another object of my invention to provide a novel control technique that permits the outputs of three inverter channels to be applied to the primaries of a three-leg transformer or to be tied in delta.

It is a further object of my invention to reduce the size and weight of a three-phase static inverter.

It is also an object of my invention to control the magnitude of the voltages generated in each of three inverter channels and to control the phase relationships between said voltages by a novel system of five control loops.

These and other objects of my invention are accomplished by constraining the phasor sum of the fundamental component of the generated voltages from three inverter channels to zero and thus suppressing the generated zero sequence voltages. The foregoing is achieved by providing a unique system of five control loops for three inverter channels. Three of these control loops are for voltage regulation in the three channels while the remaining two loops perform the function of phase control by means of sensing and minimizing the generated zero sequence voltage.

My invention may be better understood and its numerous advantages will become apparent to those skilled in the art by reference to the accompanying drawing wherein like reference numerals apply to like elements in the various figures and in which:

FIGURE 5 is a schematic drawing of a portion of a three-channel inverter showing the novel phase control circuitry of my invention.

Figure 1:
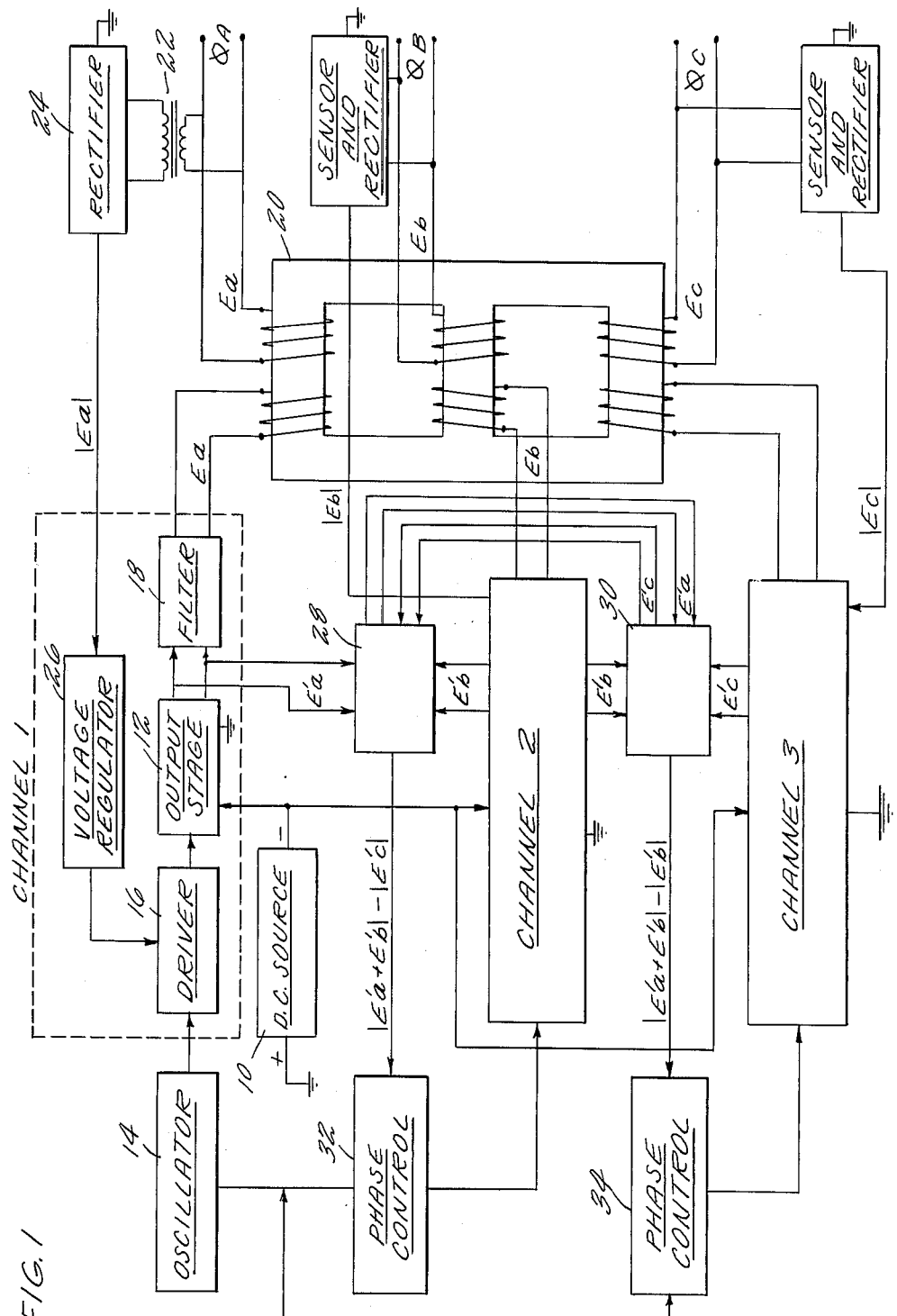
FIGURE 1 is a block diagram of a three-phase, three-channel static inverter embodying my invention.

Referring now to FIGURE 1, there is shown a block diagram of a static inverter comprised of three identical inverter channels. The D.C. voltage which is to be changed into a three-phase A.C. voltage is furnished by a direct current source 10, which may be a battery, array of solar cells, fuel cell or any other like source of direct current. The negative terminal of the D.C. source is connected to an output stage in each of the inverter channels. Considering channel 1, the output stage 12 typically is comprised of a pair of switch means which are connected to opposite ends of the primary winding of a center-tapped transformer. The positive terminal of D.C. source 10 is electrically connected to the grounded center-tap of this transformer. The two switch means in the output stage 12 are alternately closed thereby causing current to flow alternately in opposite directions through the primary winding of the transformer and thence back to source 10. The closing of the pair of switch means is controlled by an oscillator 14 which supplies a sine wave at the desired frequency to a push-pull driver stage 16. Driver stage 16 in turn generates square wave switching pulses of controllable width which are alternately applied to the two switch means in output stage 12. The current which flows in alternate directions in the primary winding of the transformer in the output stage generates a voltage which will be coupled to the secondary winding of this transformer and thence to a filter stage 18. Since the switch control pulses produced by driver 16 are square pulses, the current flow in the primary winding of the center-tapped transformer will also be in square pulses and the voltage coupled to filter 18 will approximate a square wave. The filter stage attenuates the higher harmonics of this square wave signal thereby producing a sinusoidal output voltage $E_a$. In accordance with my invention, the sine wave voltage appearing across the filter 18 is applied across a first primary winding of a three-leg transformer 20. The output voltages from the second and third inverter channels, $E_b$ and $E_c$, are respectively applied across second and third primary windings of transformer 20.

In order to present a balanced three-phase source to the load, the magnitude of the voltages generated in the three channels must be maintained equal and the proper phase relationship must be maintained between these voltages. To accomplish voltage regulation, it is common practice in the art to compare the output voltage from each channel with a reference voltage and to use the error signal for control purposes. Referring again to channel 1, the sinusoidal A.C. voltage $E_a$ generated in this channel and applied to a primary winding of transformer 20 is sensed by a small sensing transformer 22 and rectified by rectifier 24. It should be noted that there are numerous ways in which the generated voltage may be sensed. The rectified voltage $E_a$ is applied to a voltage regulator 26 in which it is compared with a reference voltage level which is typically established by a Zener diode. Error current due to the difference between the sensed and reference voltages is fed back to the driver stage 16 and controls the pulse width of the switching control pulses produced by the driver by means of controlling the bias on elements in the driver which produce the control pulses. This may preferably be accomplished by controlling the magnitude of the sine wave input from oscillator 14 at which these elements will begin to conduct and thus controlling the "on time" of the switch means in output stage 12.

Figure 2:
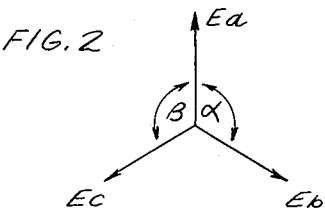
FIGURE 2 is a vector diagram of the voltages from a balanced three-phase source.

As stated above and as is obvious from FIGURE 2, five independent variables must be controlled when three inverter channels are used to provide three-phase service. Three of these variables, the magnitudes of the three generated voltages, may be controlled in the manner described above. However, as will be explained, it has not previously been possible to sense quantities at the output of the three channel system which was tied in delta or which fed a three-leg transformer which would permit control of two additional variables which, of course, are the phase angles $\alpha$ and $\beta$. It should be kept in mind that the vector sum of the currents or voltages in a three-phase system will not always be zero. There is, in general, a residual current due to unbalancing. This residual current may be represented by three equal vectors having zero phase; that is, they are not separated in time phase and will vary simultaneously in each branch. These current and voltage components are known as zero sequence components. If these zero sequence components, which cause the unbalanced output voltages of a three phase system, could be sensed at the output of the three channel system, they could be utilized to control the phase angles. The problem that, in the prior art, prohibited efficient utilization of three-channel systems arises from the fact that, if the outputs of three independent inverter channels are tied in delta, the zero sequence voltage is suppressed and it is only possible to sense three independent signals, the magnitudes of the three channel voltages, at the output, even though there are five independent variables to control when three independent channels are used. This results in two noncontrolled variables and fundamentally is a source of difficulty. This same problem is encountered when a three-leg transformer is used at the output since this device also suppresses the zero sequence. Restated, the sum of the voltages measured across a three-leg transformer must always add to zero. Thus, if the three generated voltages are maintained equal in magnitude in the manner discussed above, the three voltages measured across the three-leg transformer must be 120° out-of-phase and, consequently, the three voltages are the only measurable variables.

Upon first examination, it appears that a possible solution to the problem caused by suppression of the zero sequence components would be to use a Y connected primary and delta connected secondary three-phase to three-phase transformation at the output of the three channels and to sense on the Y side of the output transformer. Even this scheme is seen to fail upon more critical examination. In the secondary delta connected winding, the three voltages line to line, $E_a+E_b+E_c$, must add to zero vectorially. It follows then that the primary voltages which in this case are the phase voltages must also add to zero since they are related to the secondary line voltages by turns ratio. Therefore, the zero sequence is suppressed even in this case and there are two noncontrolled variables.

Figure 3:
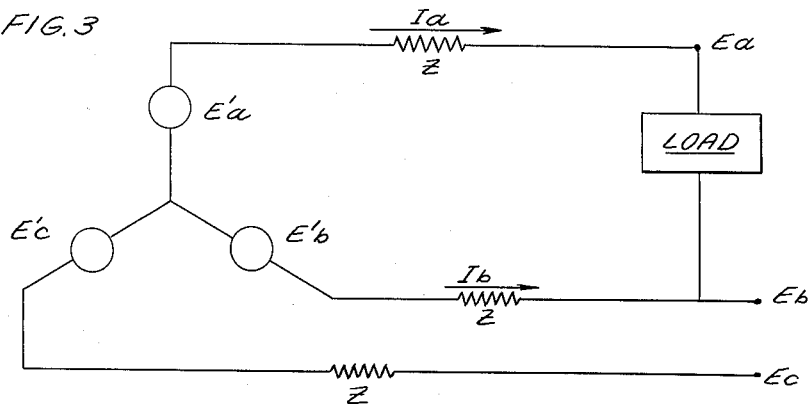
FIGURE 3 is a schematic drawing of the equivalent circuit for the inverter of FIGURE 1.
Figure 4:
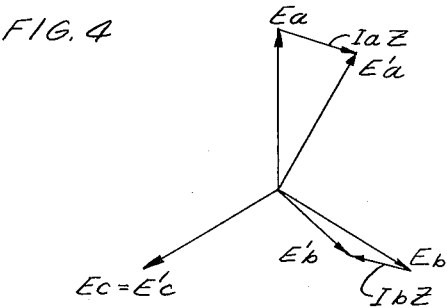
FIGURE 4 is a vector diagram illustrating the difficulties encountered in three-channel inverters with an unbalanced load when my invention is not utilized.

An example of the undesirable situation that results in having only three control loops for three independent inverter channels is shown in FIGURES 3 and 4 for an unbalanced single phase load connected across one of the secondary windings of a three leg output transformer having its secondary windings connected in Y. Assume the three control signals derived from the three measurable variables are used to control the magnitudes of the generated voltages $E_a'$, $E_b'$ and $E_c'$ so as to provide three equal output voltages $Ea$, $Eb$ and $Ec$ and that the generated voltages are phase locked 120° apart. It is desired to have the three output signals $E_a$, $E_b$ and $E_c$ at the secondary of the three-leg transformer form a balanced three-phase set. With unbalanced currents $I_a$, $I_b$ and $I_c$, this can only be accomplished with an unbalanced set $E_a'$, $E_b'$ and $E_c'$ of voltages from the inverter channels. For example, consider $I_a=-I_b$, $I_c=0$, $Z=$the series impedance of the filters in each channel and the vector diagram shown in FIGURE 4. The desired generated voltages $E_a'$, $E_b'$ and $E_c'$ are, as shown, obviously not 120° apart in phase. However, if the generated voltages are, as has been previously attempted, constrained to be 120° apart, the result is that an extraneous zero sequence set is generated and must be filtered. This zero sequence voltage will appear across the filter series impedance because the terminal conditions present a short to the zero sequence voltages. Experiments have shown that the zero sequence voltage drop may be larger than the normal drop $I_aZ$ across the filter and may be exceed the filter's power handling capacity or the inverters generating capacity. This undesirable condition is expressed by the followng set of equations:

(1) $\qquad E_a''=Ea+IZ+Eo$
(2) $\qquad E_b''=Eb-IZ+Eo$
(3) $\qquad E_c''=Ec+Eo$ where:

$E_a''$, $E_b''$, $E_c''$ are the generated voltages which are constrained 120° apart $Ea$, $Eb$, $Ec$ are the channel output voltages which are equal in magniture and, due to suppression of the zero sequence in the three-leg transformer, displaced by 120°

$IZ$ is the desired drop across the filter series impedance caused by the load current, and $Eo$ is the zero sequence voltage From Equations 1, 2 and 3 it should be obvious that failure to suppress the generated zero sequence voltage may result in a voltage drop across the filter's series impedance which would damage the filter or generator or both.

The solution to the above-detailed problem must obviously involve the addition of two more control loops. At the output of the three channel system, three independent control signals are available and these are used, in the manner described above, to provide three of the five required generator control signals which are utilized for voltage regulation in each channel. Given the magnitudes of these three voltages, the phase angles, two of which must also be controlled, are dependent variables which may be determined from the law of cosines by:

(4) controlling the angle $\beta$ by minimizing $$|E_a'+E_c|-|E_b'|$$

and (5) controlling the angle $\alpha$ by minimizing $$|E_a'+E_b'|-|E_c'|$$

The foregoing expressions may be solved by first sensing, combining and then rectifying the generated voltages in accordance with Equations 4 and 5 in a pair of circuits such as 28 and 30 of FIGURE 1. The D.C. error voltage from circuits 28 and 30 are respectively applied to phase control circuits 32 and 34. Circuits 32 and 34 comprise phase sensitive modulators which convert the D.C. error voltage to a square wave which is then added to the sine wave output of the oscillator 14. The resultant complex waves, which are used to energize the driver stages in channels two and three, will be shifted in phase by an amount dependent upon the amplitude of the error voltages and in a direction which will tend to minimize the error voltages. Thus, by this technique, it is possible to maintain the proper phase relationships between the three generated voltages. This procedure, which is essentially the sensing and minimizing of the generated zero sequence voltage, requires the measurement of the generated voltage in each channel at a point ahead of the filters in each channel since, as is stated above, the zero sequence voltage is suppressed by the three-leg transformer 20. That is, the zero sequence voltage is dropped across the filter impedance.

Referring now to FIGURE 5, there is shown a schematic drawing of the instrumentation of the method for sensing the zero sequence voltage discussed above. In this figure, the three voltage magnitude control loops have been omitted for the purpose of clarity. The three inverter channels, less the series filters and sensing means, are represented as single phase generators 1, 2 and 3. The voltage generated in each of the three channels is sensed by sensing transformers 40, 42, 44 and 46. The sensed voltages are filtered, to eliminate harmonics, by small, light weight filter units 48, 50, 52 and 54. It should be noted that transformer 46 and filter 54 may be eliminated and the voltage $E_b'$ measured across filter 50. Voltages $E_a'$ and $E_b'$ are added together by transformer 56 and the sum rectified by rectifier 58 thus producing the quantity $|E_a' + E_b'|$. From this quantity, $|E_c'|$, which is produced by rectifying the output of filter 52 in rectifier 60, is subtracted in a subtraction circuit 62. The error voltage from subtractor 62 is applied to phase control 32 to adjust phase angle $\alpha$. In a like manner, transformer 64, rectifiers 66 and 68, and subtraction circuit 70 produce an error signal in accordance with Equation 5 above. Thus, five variables are controlled and a balanced three-phase service achieved.

Proof that the foregoing phase control procedure results in an operative inverter follows below. It will be shown that if the zero sequence voltage is suppressed, $$(6) \quad \vec{E_a'} + \vec{E_b'} + \vec{E_c'} = 0$$

Figure 6:
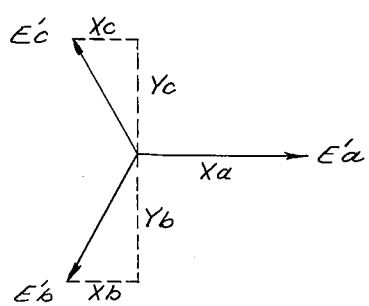
FIGURE 6 is a vector diagram which proves the effectiveness of the control technique illustrated in FIGURE 5.

The foregoing is assured if phase angle $\alpha$ is adjusted to make:

$$(7) \quad |\vec{E_a'} + \vec{E_b'}| = |\vec{E_c'}|$$

and if phase angle $\beta$ is adjusted to make:

$$(8) \quad |\vec{E_a'} + \vec{E_c'}| = |\vec{E_b'}|$$

where:

$E_a'$, $E_b'$ and $E_c'$ are the three voltages sensed ahead of the series filters. Referring now to FIGURE 6:

Let $$E_a = x_a + j0 \quad (9)$$
$$E_b = -x_b - jy_b \quad (10)$$
$$E_c = -x_c + jy_c \quad (11)$$

Substituting 9, 10 and 11 into 8 yields $$(x_a - x_c)^2 + y_c^2 = x_b^2 + y_b^2 \quad (12)$$

or $$x_a^2 - 2x_a x_c + x_c^2 + y_c^2 = x_b^2 + y_b^2 \quad (13)$$

Substituting 9, 10 and 11 into 7 yields $$(x_a - x_b)^2 + y_b^2 = x_c^2 + y_c^2 \quad (14)$$

or $$x_a^2 - 2x_a x_b + x_b^2 + y_b^2 = x_c^2 + y_c^2 \quad (15)$$

Adding 13 and 15

$$x_a = x_b + x_c \quad (16)$$

Substituting 16 into 12 yields $$x_b^2 + y_c^2 = x_b^2 + y_b^2$$

or $$y_c^2 = y_b^2 \quad (17)$$

16 and 17, considered with reference to FIGURE 6, complete the proof by yielding 6.

While a preferred embodiment has been shown and described, various modifications and substitutions may be made without deviating from the scope and spirit of my invention. Thus my invention is described by way of illustration rather than limitation and accordingly it is understood that my invention is to be limited only by the appended claims taken in view of the prior art.

I claim:

1. A three-phase static inverter comprising:
   an oscillator circuit;
   first switch means coupled to and controlled by the output signals from said oscillator circuit for converting direct current to alternating current, said first switch means providing a first A.C. output voltage and being adapted to have its input terminals connected to a source of direct current;
   a first phase control circuit coupled to the output of said oscillator circuit for generating a signal having the same frequency but shifted in phase with relation to the oscillator output signal;
   second switch means connected to said first phase control circuit and controlled by the signal generated thereby for converting direct current to alternating current, said second switch means providing a second A.C. output voltage differing in phase from said first A.C. voltage and being adapted to have its input terminals connected to a source of direct current;
   a second phase control circuit coupled to the output of said oscillator circuit for generating a signal having the same frequency but shifted in phase with relation to the output signals of said oscillator and said first phase control circuit;
   third switch means connected to said second phase control circuit and controlled by the signal generated thereby for converting direct current to alternating current, said third switch means providing a third A.C. output voltage differing in phase from said first and second A.C. voltages and being adapted to have its input terminals connected to a source of direct current;
   a three-leg transformer having a primary and a secondary winding on each leg thereof;
   means applying the A.C. output voltages provided by said first, second and third switch means respectively to first, second and third primary windings on said three-leg transformer;
   means for connecting a three-phase load across the three secondary windings on said three-leg transformer;
   means for sensing the magnitudes of the voltages across the secondary windings on the first, second and third legs of said three-leg transformer and for generating signals commensurate therewith;
   voltage regulator means connected to said sensing means and responsive to said signals commensurate with magnitude for generating first, second or third error signals whenever any of said magnitude signals departs from a desired value;
   means applying said first, second and third error signals respectively to said first, second and third switch means to control the magnitude of the A.C. output voltages provided thereby;
   means responsive to the A.C. output voltages provided by said first, second and third switch means for generating a fourth error signal commensurate with any variation from the desired phase relationship between the A.C. voltages provided by said first and second switch means;
   means for applying said fourth error signal to said first phase control circuit for controlling the phase of the signal generated thereby;
   means responsive to the A.C. output voltages provided by said first, second and third switch means for generating a fifth error signal commensurate with any variation from the desired phase relationship between the A.C. voltages provided by said first and third switch means; and means applying said fifth error signal to said second phase control circuit for controlling the phase of the signal generated thereby.

2. The apparatus of claim 1 wherein said means for generating fourth and fifth error signals commensurate with variations from desired phase relationship each comprises:

means responsive to the A.C. output voltages provided by said first, second and third switch means for sensing a component of the zero sequence voltage generated by said switch means and generating a signal commensurate therewith.

3. The apparatus of claim 1 further comprising:

first, second and third filter circuits respectively connected between the first, second and third primary windings on said three-leg transformer and said first, second and third switch means.

4. The apparatus of claim 3 wherein said means for generating fourth and fifth error signals commensurate with variations from desired phase relationship each comprises:

means for sensing the A.C. output voltages provided by said first, second and third switch means ahead of said filter circuits and for generating signals commensurate therewith; and means responsive to said signals commensurate with the A.C. output voltages provided by said first, second and third switch means for generating fourth and fifth error signals commensurate with the zero sequence components of the A.C. output voltages provided by said switch means.

5. The apparatus of claim 4 wherein the means for generating a fourth error signal commensurate with a zero sequence voltage component comprises:

means for adding the signals commensurate with the A.C. voltages provided by said first and second switch means and for producing a signal commensurate with the magnitude of the sum thereof; and means for subtracting the signal commensurate with the magnitude of the A.C. voltage provided by said third switch means from the signal produced by said adding means whereby a fourth error signal indicative of a phase error between the A.C. output voltages provided by said first and second switch means is produced.

6. The apparatus of claim 5 wherein the means for generating a fifth error signal commensurate with a zero sequence voltage component comprises:

means for adding the signals commensurate with the A.C. voltages provided by said first and third switch means and for producing a signal commensurate with the magnitude of the sum thereof; and means for subtracting the signal commensurate with the magnitude of the A.C. voltage provided by said second switch means from the signal produced by said adding means whereby a fifth error signal indicative of a phase error between the A.C. output voltages provided by said first and third switch means is produced.

References Cited by the Examiner

UNITED STATES PATENTS

| 2,824,274 | 2/1958 | Holt | 321—27 |
| 3,050,674 | 8/1962 | Moore | 321—5 |

FOREIGN PATENTS 875,149  8/1961  Great Britain.

OTHER REFERENCES

"Static Inverter Delivers Regulated 3-Phase Power," by M. Lilienstein: Published in Electronics, July 8, 1960, vol. 33, No. 28; pp. 55–59.

LLOYD McCOLLUM, *Primary Examiner.*

G. J. BUDOCK, *Assistant Examiner.*